United States Patent [19]

Räther

[11] Patent Number: 5,069,608
[45] Date of Patent: Dec. 3, 1991

[54] VANE PUMP FOR DELIVERING PASTY SUBSTANCES

[75] Inventor: Siegfried Räther, Bad Segeberg, Fed. Rep. of Germany

[73] Assignee: Nordischer Mashinenbau Rud. Baader Gmbh & Co Kg, Lubeck, Fed. Rep. of Germany

[21] Appl. No.: 343,283

[22] Filed: Apr. 26, 1989

[30] Foreign Application Priority Data

Apr. 27, 1988 [DE] Fed. Rep. of Germany ... 8805548[U]

[51] Int. Cl.$^5$ .......................... A22C 11/08; A04C 2/00
[52] U.S. Cl. ........................................ 418/261; 452/41
[58] Field of Search ....................... 418/260, 261, 264; 17/37, 35; 452/41

[56] References Cited

U.S. PATENT DOCUMENTS

| | | | |
|---|---|---|---|
| 954,832 | 4/1910 | Waldron | 418/264 X |
| 1,269,937 | 6/1918 | Hutsell | 418/261 X |
| 2,969,935 | 1/1961 | Price | 418/264 X |
| 3,543,330 | 12/1970 | Muller | 17/37 |

FOREIGN PATENT DOCUMENTS 220519  5/1974  France .

Primary Examiner—Michael Koczo
Attorney, Agent, or Firm—Fay, Sharpe, Beall, Fagan, Minnich & McKee

[57] ABSTRACT

A vane pump delivers pasty materials, particularly sausage stuffing, for the purpose of filling doses of the stuffing into sausage cases. The flow of material into the pump chamber generally takes place by a stuffing device in the hopper and by the action of the vacuum to which the vane pump is exposed. The degree of filling and therefore the dosing accuracy is improved by providing a curved portion in the transition area between the inner wall of the cylindrical part of the cup-shaped pump casing and the base part of the latter receiving the pump rotor mounting.

2 Claims, 1 Drawing Sheet

VANE PUMP FOR DELIVERING PASTY SUBSTANCES

BACKGROUND OF THE INVENTION

1. Field of the Invention

The invention relates to a vane pump for delivering pasty substances particularly sausage stuffing, e.g. for the purpose of producing portions of even weight and/or volume, comprising a casing surrounding a pump chamber and having an inlet and and an outlet and a pump rotor driven to rotate in the casing and having guided, plate-like slides, which are arranged to be guided displaceably in radial direction and to engage in sealingly sliding manner on the axial boundary surfaces of the pump chamber and which over at least part of one rotation together with the pump rotor are kept in contact with the radial inner wall of the pump chamber.

2. Prior Art

Vane pumps of this type are known in numerous different constructions from the prior art.

Reference is e.g. made to French Patent 2 205 119, in which use is made of a circular pump rotor provided with plate-like slides, which rotor is mounted so as to revolve in a cylindrical casing, and has an eccentric arrangement. During the rotation of the slides, they are on the one hand supported on the inner wall of the casing and on the other hand on a sleeve arranged within the pump rotor and positioned centrally with respect to the casing. Following onto the crescent-shaped pump chamber, the supply and discharge openings face one another between said sleeve and the inner area of the circular pump rotor.

British Patent 1 056 529 discloses a vane pump based on a different design. This apparatus used as a filling means for filling sausage stuffing into skins has a pump rotor eccentrically mounted in a casing and having the form of a driven hub, which rotor is equipped with plate-like slides radially guided therein. The slides are supported on the inner wall of the casing and are kept in contact with the inner wall in a channel curve or cam worked into an axial terminating surface thereof. Whereas, under axial orientation, the inlet port is connected to the crescent-shaped pump chamber, the outlet port is positioned tangentially.

The principle which is mainly used in practice corresponds to the latter apparatus with respect to the positioning of the inlet and outlet ports. Particularly in the case of highly viscose and low moisture content sausage stuffing types, difficulties are encountered in bringing about a complete filling of the pump chamber, so that the dosing accuracy is unsatisfactory.

3. Object of the Invention

It is the main object of the present invention to improve the degree of filling of the pump chamber.

SUMMARY OF THE INVENTION

Vane pumps having a casing surrounding a pump chamber and having an inlet and an outlet. A pump rotor is driven to rotate in the casing and guided, plate-like slides, which are arranged to be guided displaceably in the radial direction. They engage in sealingly sliding manner on the axial boundary surfaces of the pump chamber over at least part of one rotation together with the pump rotor and are kept in contact with the radial inner wall of the pump chamber. According to an object of the invention, the transition area between at least one of the axial boundary faces of the pump chamber and the radial inner faces thereof is curved or designed with a curved portion. Thus, the invention makes use of the finding that the inadequate filling is mainly observed in those parts of the pump chamber, which are furthest from the inlet port. This in particular relates to the transition area between the axial boundary surface of the pump chamber facing the inlet port and the radial inner wall of the chamber, it being disadvantageous that for constructional reasons this transition area results from the adjacent nature of fixed walls.

The improvement resulting to the degree of filling is in particular due to the fact that this critical part of the pump chamber acquires a construction, which is adapted to the radius-like flow front of a flowable mass naturally occurring due to the frictional ratios when the mass slides along a fixed wall.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
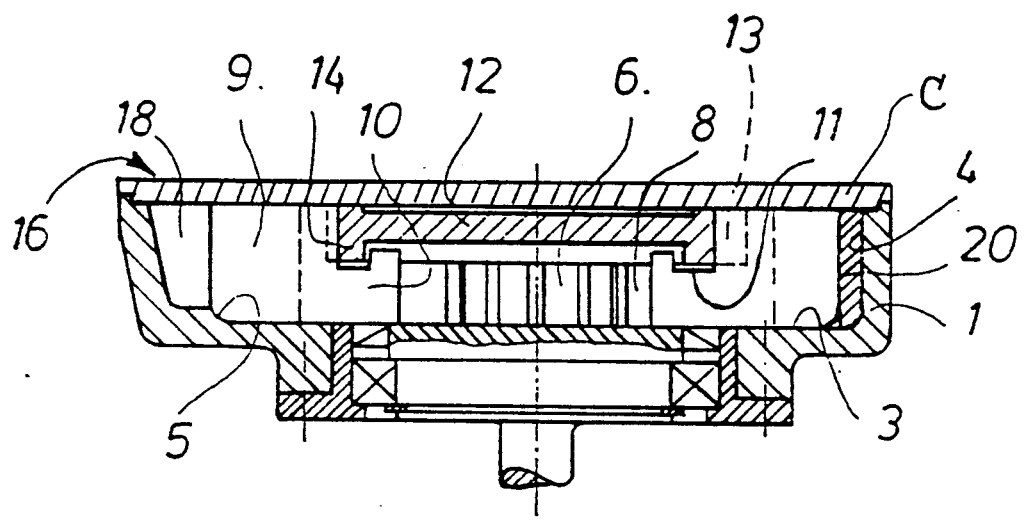
FIG. 1 shows a cross-section through the vane pump along section line I—I of FIG. 2.
Figure 2:
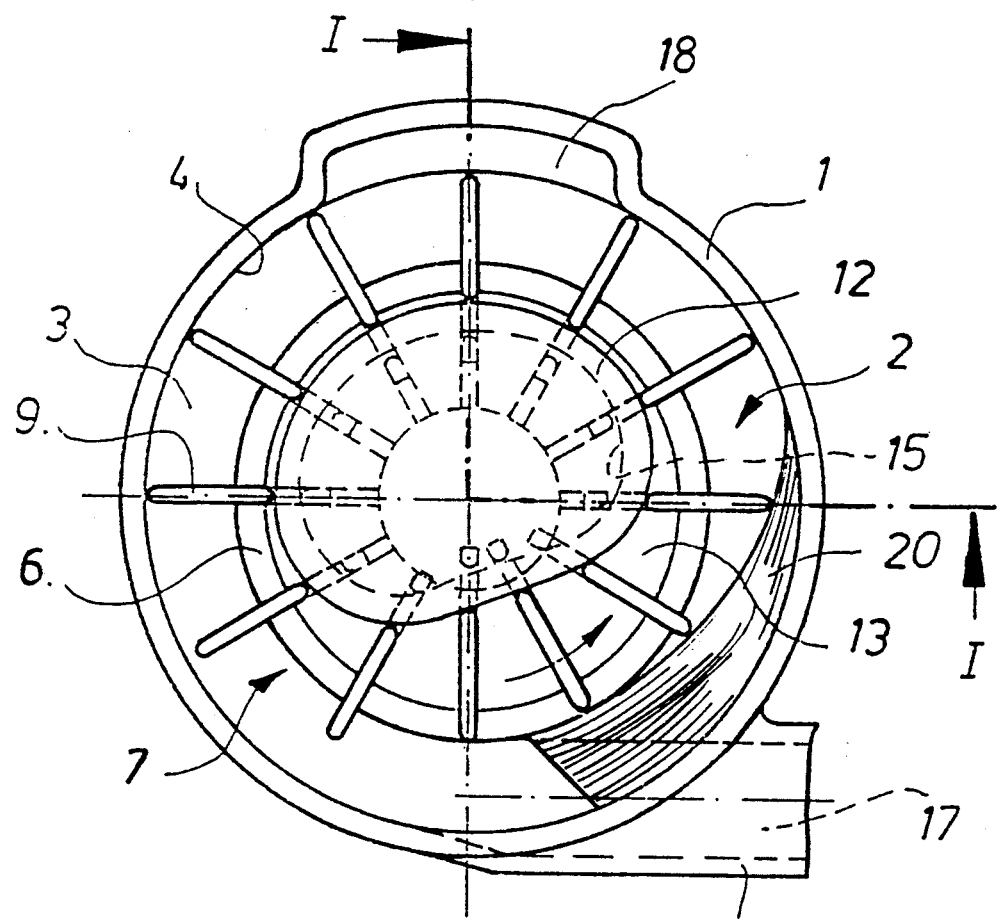
FIG. 2 shows a plan view of the vane pump without a cover according to the invention by way of simplified representation.

A vane pump according to the present invention is e.g. a component of a not shown filling or stuffing apparatus for the producing of sausages and is driven by a not shown, preferably controllable drive, e.g. by a stepping motor. The vane pump comprises a pump casing 1, which surrounds a pump chamber 2 having a cup-shaped configuration with a base or bottom part 3 and a cylinder part 4 and can be closed by a cover C, so that a cavity is obtained in the form of a cylindrical disk. The transition area between the base part 3 and the cylinder part 4 is curved or formed by a curved portion 5. A pump rotor 6 is mounted in the base part 3 of the pump casing 1 concentrically with regard to the cylinder part 4, which rotor with a substantially cylindrical hub part 7 fills the pump chamber 2 between the cover and the base part 3 under a close sliding fit. The hub part 7 is provided with axially extending radial slits 8, in which plate-like slides 9 are displaceably guided to be displaced under slight sliding fit. In the region of an offset part 10, the slides 9 are provided with a transversely extending slot 11, which is engaged by a control cam 12. The latter is arranged in a recess 13 in the pump rotor 6 directed towards the cover of the pump casing 1 and is fixed by the cover of pump casing 1 by suitable fixing means in such a way that it does not turn. The control cam 12 is designed as a cam disk and is bounded by a cam web 14 forming the periphery which web simultaneously forms an inner cam 15. As stated hereinbefore, the controlling action on the slides 9 takes place by the engagement of the cam web 14 in its particular slot 11. The pump casing 1 has an inlet port or opening 16 and an outlet port or opening 17, which roughly diametrically face one another. The inlet port 16 is constructed as a pocket 18 in the cylinder part 4 of the pump casing 1 and is functionally associated with a hopper to supply the stuffing through the inlet 16 in a direction substantially parallel to the axis of rotation of the group cover. The outlet port 17 is located in a connecting piece 19 fitted roughly tangentially to the pump casing 1 and penetrates a wedge segment 20 arranged in the pump casing 1, which segment snugly engages in the cylinder part 4, in the region of the outlet port 17 and in the direction of rotation of the pump rotor 6 upstream of said port. This wedge segment 20 starts in a practically cutting edge-like manner and terminates with a bearing face on the cylinder part 4 of the pump rotor 6.

The function is as follows:

The material, e.g. sausage meat or stuffing stored in the not shown hopper, is pushed by suitable means installed in said hopper in the direction of its outlet port. This process is assisted in known manner by the action of vacuum, to which the pump chamber 2 is exposed. As a result of these two measures the sausage stuffing flows into the pocket 18 of the pump casing 1. Particularly in the case of high viscosity sausage stuffing types with a low moisture content, a radius-like flow front forms in particular in the vicinity of fixed wall parts, which is due to the fact that the friction between such wall parts and the sausage stuffing is generally greater than the internal friction within the actual stuffing itself. Thus, the sausage stuffing flow is held back on the wall of the cylinder part 4 of the pump casing 1 compared with that in the core regions of the flow cross-section, so that such core regions firstly meet the base part 3. As a result of the construction of the transition area between the latter and cylinder part 4 with the curved portion 5, at this instant the complete cross-section is also filled in said area without there having to occur any change to the shape of flow front.

Thus, particularly in the case of the aforementioned sausage stuffing types that are difficult to process, a more reliable filling of the vane pump that improves the dosage accuracy is achieved, which consequently enables the pump to operate at high performance efficiency.

The remaining part of the chambers between the slides 9 and the pump rotor 6 are filled without any difficulty, because the abutting edges of the surfaces delineating the chambers are moved relative to one another, such that forces easily deforming the flow fronts come into action.

As a result of the rotation of the pump rotor 6, the filled chambers between the slides 9 now move in the direction of the outlet port 17, the slides 9 being gradually retracted out of the pump chamber 2, so that the chambers between the slides 9 increasingly combine or unify towards the outlet port 17. Shortly before reaching wedge segment 20, slides 9 have retracted to such an extent that their outer radial boundary edges previously engaging on the inner wall of the cylinder part 4 of the pump chamber 2 are flush with the circumferential surface of the pump rotor 6 and can penetrate under the wedge segment 20.

Thus, the sausage stuffing is moved towards the outlet port 17, particularly by the last slide 9 upstream of port 17 and sealing with respect to the inner wall of cylinder part 4. The clearly defined cavities resulting from the withdrawal of the slides 9 are filled due to the dynamic counterpressure in the discharge channel. This leads to a pulsation-free filling flow having a substantially ideal homogeneity.

What is claimed is:

1. A vane pump for delivering pasty materials, particularly sausage stuffing to product portions of at least one of even weight and even volume of said material, the vane pump comprising:
    a) a casing,
    b) a pump chamber surrounded by said casing defined by a radial inner wall, and closed by two axial boundary faces,
    c) a pump rotor mounted in casing and driven to rotate therein about an axis of rotation,
    d) plate-like slide means guided to be displaced in said casing radially relative to said axis of rotation and constructed so as to engage in sealingly sliding manner on said axial boundary faces formed in said pump chamber, said slide means, over at least part of one revolution of said pump rotor, contacting said radial inner wall of said pump chamber,
    e) an inlet and an outlet, both arranged in said casing, with said inlet being arranged in one of said axial boundary faces in the region of a path of revolution of said slide means so as to enable a supplying of the pasty material to said chamber substantially in a direction parallel to said axis of rotation, and
    f) a transition area formed between at least one of said axial boundary faces and said radial inner wall in the shape of a curve.

2. A vane pump for delivering pasty materials, such as sausage stuffing, to produce portions of at least one of even weight and even volume of said materials, comprising:
    a cylinder part, a cylindrical hub, a base portion, and a casing wherein the cylinder part and the hub extend between said base and said casing to define a pump chamber;
    a pump rotor mounted in said casing that rotates about an axis of rotation;
    plate-like slide means displaceably mounted within said hub to move radially relative to said axis of rotation into and out of said pump chamber, said plate-like slide means engaging said pump chamber walls in sliding, sealing engagement over at least part of one revolution of said pump rotor;
    an inlet in said casing for supplying the pasty material to the pump chamber and an outlet for delivering the pasty material exiting the pump chamber; and
    said pump chamber having a curved portion between said base and said cylinder part for contacting the flow front of the pasty material to assist in completely filling the pump chamber.

* * * * *